United States Patent
Schneider

(10) Patent No.: US 6,757,979 B1
(45) Date of Patent: Jul. 6, 2004

(54) SECATEURS WITH A CUTTER BLADE AND AN ANVIL WHICH INTERACTS WITH THE CUTTER BLADE

(75) Inventor: Manfred Schneider, Wendel (DE)

(73) Assignee: Wolf-Garten GmbH & Co. KG (DE)

( * ) Notice: Subject to any disclaimer, the term of this patent is extended or adjusted under 35 U.S.C. 154(b) by 0 days.

(21) Appl. No.: 09/623,305

(22) PCT Filed: Apr. 30, 1999

(86) PCT No.: PCT/EP99/02962

§ 371 (c)(1),
(2), (4) Date: Aug. 30, 2000

(87) PCT Pub. No.: WO99/59396

PCT Pub. Date: Nov. 25, 1999

(30) Foreign Application Priority Data

May 15, 1998 (DE) .......................... 198 21 924

(51) Int. Cl.[7] .............................. A01G 3/02; B26B 17/00
(52) U.S. Cl. .............................. 30/186; 30/175; 30/193
(58) Field of Search .......................... 30/181, 186, 193, 30/173, 175, 191, 192, 145, 177; 411/959

(56) References Cited

U.S. PATENT DOCUMENTS

| | | | |
|---|---|---|---|
| 1,467,824 A | * 9/1923 | Ahlers ........................ 411/270 |
| 1,877,376 A | * 9/1932 | Wright et al. ............. 30/181 X |
| 1,899,715 A | * 2/1933 | Olson ...................... 411/959 X |
| 2,207,994 A | * 7/1940 | Trapp .......................... 30/181 |
| 2,229,263 A | * 1/1941 | Van Keuren ............. 30/181 X |
| 2,274,945 A | * 3/1942 | Van Keuren ............. 30/181 X |
| 2,528,815 A | * 11/1950 | Boyer .......................... 30/145 |
| 2,763,312 A | * 9/1956 | Redmer .................. 411/959 X |
| 2,821,018 A | 1/1958 | Schwieso ..................... 30/186 |
| 3,324,549 A | * 6/1967 | Sharp .......................... 30/181 |
| 3,372,478 A | 3/1968 | Wallace et al. ............... 30/193 |
| 5,272,810 A | 12/1993 | Orthey ........................ 30/186 |

FOREIGN PATENT DOCUMENTS

EP 0527358 2/1993

* cited by examiner

*Primary Examiner*—Clark F. Dexter
(74) *Attorney, Agent, or Firm*—Ostrolenk, Faber, Gerb & Soffen, LLP

(57) ABSTRACT

An anvil of a set of secateurs can be displaced in relation to a supporting limb on a swivel axis to permit alignment of the anvil with an edge of a cooperative cutting blade. A bolt and nut are arranged in a hole of the secateur limb to prevent rotation of the nut. The bolt and/or nut has an annular blade facing towards the anvil. The annular blade becomes embedded in the anvil as the bolt is screwed into the nut, thereby forming a positive fit. The bolt shaft is guided through an arched slit in the anvil that extends concentrically in relation to a swivel axis about which the anvil pivots during adjustment. The anvil pivot angle is approximately 2°.

18 Claims, 3 Drawing Sheets

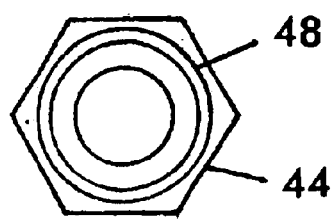
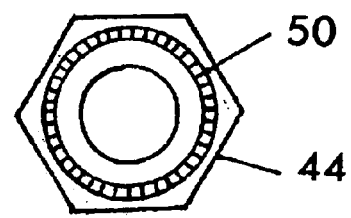
FIG. 5A                FIG. 5B
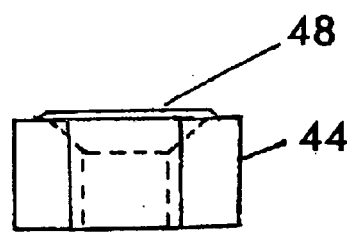
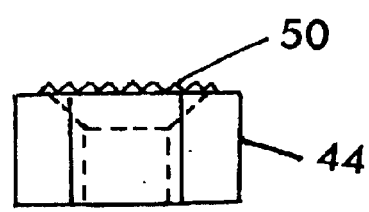
FIG. 5C                FIG. 5D

SECATEURS WITH A CUTTER BLADE AND AN ANVIL WHICH INTERACTS WITH THE CUTTER BLADE

The invention relates to secateurs that are adjustable to provide a precise alignment between a cutting blade edge and an anvil surface. The production of such secateurs involves the problem of alignment between the cutting edge and anvil surface. When the secateurs are closed, the cutting edge of the cutting blade is intended to rest, over its entire length, on the anvil surface such that no light gap can be seen therebetween. This condition cannot easily be satisfied in production on account of tolerances, with the result that adjustments are usually necessary in order to adjust the cutting edge parallel to the anvil surface. It has been found in practice that, in production, there may be an angle of 1° between the cutting edge and anvil surface to both sides of the zero line.

Adjustment by bending the secateur parts is difficult and requires specialist experience and is also very time-consuming.

In order to simplify the adjustment, it is known for the anvil (or the cutting blade) to be rendered adjustable in relation to the bearing secateur limb via a guide, the two parts being fixed by screw/nut bracing.

U.S. Pat. No. 3,372,478 discloses such an arrangement in which the anvil is provided with a curved bearing surface which rests on a correspondingly curved bearing surface of the secateur limb which bears the anvil. The anvil is fastened on the secateur limb by a clamping screw.

In secateurs according to U.S. Pat. No. 2,528,815, the anvil can be displaced in a guide and is supported against pin stops. Firm clamping takes place via a clamping screw, which projects in through an adjustment-permitting slot.

According to EP-A-0 527 358, the guide adjustment device comprises two slots which are positioned with opposite directions of inclination in relation to the cutting edge and have anvil sleeves passing through them, it being possible for screws to be screwed into said anvil sleeves, the anvil being clamped firmly in the process.

U.S. Pat. No. 2,821,018 discloses secateurs of the generic type in which a removable anvil can be secured on the secateur limb in an adjustable manner by way of two screws, it being possible for the adjustment to take place such that the cutting edge of the cutting blade produces linear contact with the anvil throughout when the limbs are closed. As with the other known secateurs described above, the securing operation also takes place in this case with a friction clip.

All these adjustment devices allow precise light-gap-free adjustment between the anvil and cutting edge. However, it is not always ensured that the adjustment position is reliably maintained. If the screw is not screwed firmly enough into the lock nut or loosens or, for some other reasons, the friction fit provided by the bracing between the anvil and secateur limb is not sufficient in order to withstand the forces occurring, then angular adjustment cannot be ruled out, which results in a wedge-shaped light gap in one direction or the other.

Such secateurs are subjected to a wide variety of stressing in dependence on where, for example, a branch which is to be cut, comes to rest on the anvil and whether said branch runs perpendicularly to the cutting edge or obliquely thereto while the cut is executed. For this reason, stressing which results in a sliding movement may occur.

The object set forth is achieved by providing a screw in an arcuate slot to permit adjustment of a relationship between and edge of the cutting blade and the anvil. The screw has an annular cutting edge that can provide a clamping mechanism in conjunction with the anvil. Since the nut digs into the anvil, which generally consists of aluminum, by way of its annular cutting edge, this achieves a form-fitting groove/tongue connection which rules out mutual adjustment even under extremely high stressing.

The set object is achieved by the features specified in the defining part of patent claim 1. Since the nut digs into the anvil, which generally consists of aluminum, by way of its annular cutting edge, this achieves a form-fitting groove/tongue connection which rules out mutual adjustment even under extremely high stressing.

The possible adjustment between the anvil and secateur blades can take place in various ways, for example via two slots which are positioned with opposite directions of inclination in relation to the cutting edge and have the clamping screws passing through them, as is the case for example, in EP-A-0 527 358.

According to the preferred embodiment of the invention, two standard screws are provided, of which one acts through a bushing designed as a pivot bearing (small amount of play, no loading on the thread) and the other acts in a circle-arc slot which is concentric with said bushing and can automatically be secured with a form fit, by way of its cutting nut, at a location determined by the adjustment in closing of the secateurs. According to the preferred embodiment, the arcuate slot is provided in the anvil, which consists of aluminum, while the cutting nut is inserted in a rotationally fixed manner in the secateur limb, which consists of hardened steel.

Accordingly, using the principle of the invention, different versions which all have in common the idea of an annular cutting edge cutting or pressing in, and are all to be afforded protection, are conceivable.

An exemplary embodiment of the invention is described hereinbelow with reference to the drawing, in which:

FIG. 5A is a top view of a first embodiment of nut used in the secateurs;

FIG. 5B is a top view of a second embodiment of nut;

FIG. 5C is a side view of the first embodiment of a nut; and

FIG. 5D is the side view of the second embodiment of a nut.

Figure 1:
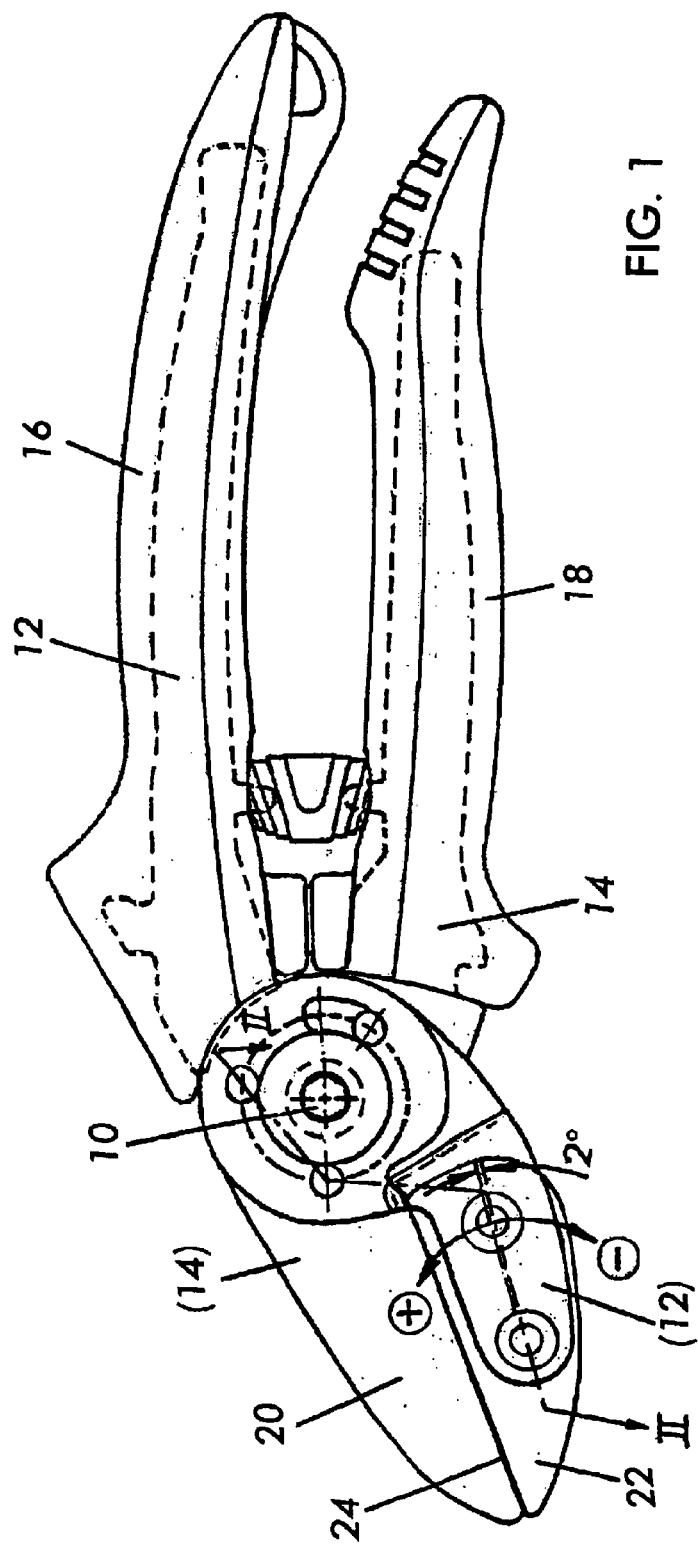
FIG. 1 shows a view of closed secateurs according to the invention.

The invention can be used in all secateurs, even tree pruners, in which it is necessary for the two cutting bodies to be brought together in a gap-free manner in the closed state of the secateurs.

According to the exemplary embodiment illustrated, the secateurs have two secateur limbs 12 and 14 which are connected to one another in a pivotable manner via a bearing screw 10 and respectively bear handle shells 16 and 18 on the handle side. The first secateur limb 14 bears a cutting blade 20, which is connected firmly to it, and the second secateur limb 12 bears the anvil 22 via an adjustable adjustment device. In the closed state of the secateurs, the cutting blade is intended, by way of its cutting edge 24, to butt against the anvil surface in a gap-free manner over the entire length.

Figure 2:
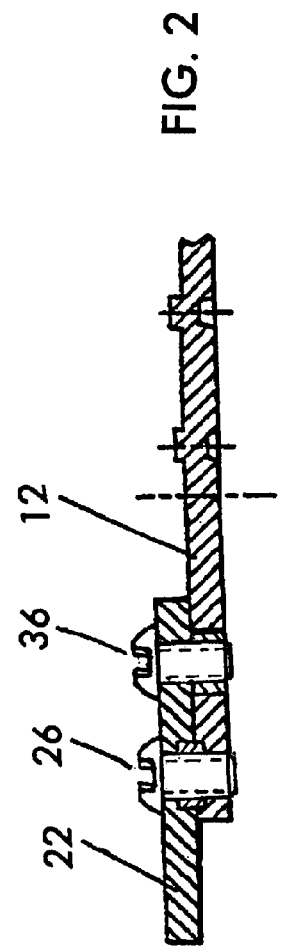
FIG. 2 shows a section along the line II—II according to FIG. 1.
Figure 3:
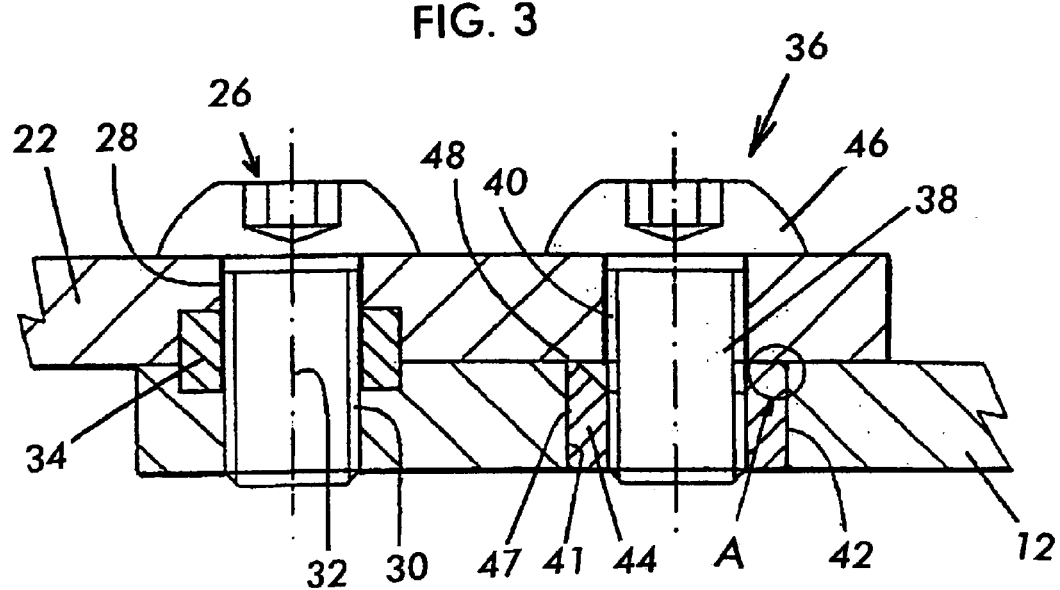
FIG. 3, shows, on an enlarged scale, the connection between the secateur limb and anvil.
Figure 4:
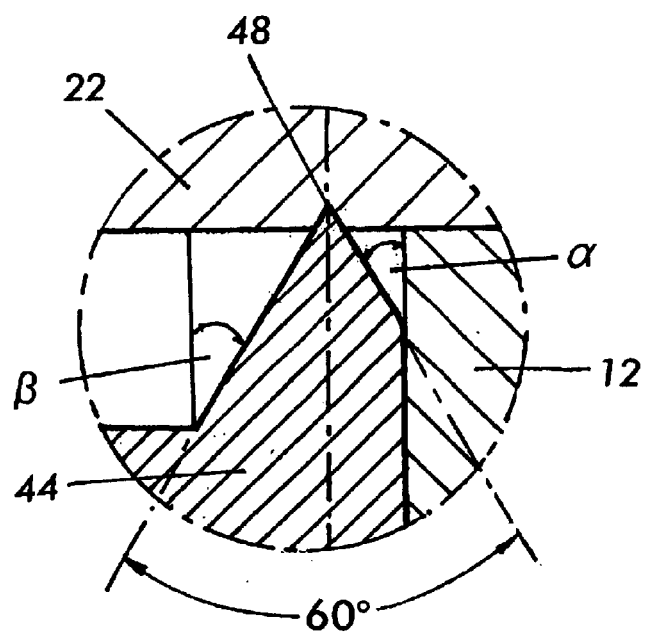
FIG. 4 shows, on an even larger scale, the region enclosed by a circle in FIG. 3.

The device illustrated in detail in FIGS. 2 to 4 bears for compensating for production-induced tolerances and for the light-gap-free anvil adjustment.

A first screw 26 is guided through a bore 28 of the anvil 22 and through a bearing bushing 34 and is screwed into a threaded hole 30 of the second secateur limb 12, which consists of steel. The steel bearing bushing 34 is located in a recess of the secateur limb 12 and a recess of the anvil 22 which is aligned therewith. The bearing bushing forms the pivot axis 32 for the anvil 22 with very low radial tolerances.

A second screw 36 projects, by way of its shank 38, through an arcuate slot 40 which is arranged in the anvil 22 concentrically with the pivot axis 32 over an angle range of 2°. A cutting nut 44 is inserted in a rotationally fixed manner in a hole 42 of the second secateur limb 12. Said nut 44 has lateral flattened sections 47 which butt against lateral flattened sections 41 of the hole 42 and prevent the nut 44 from rotating in relation to the second secateur limb 12. Screwed into this nut 44 is the threaded shank 38 of the second screw 36, which has its screw head 46 supported on the top side of the anvil 22 and has a hexagonal socket. On its annular end surface which is directed toward the anvil 22, the cutting nut 44 bears an annular cutting edge 48 which digs into the anvil 22, which consists of aluminum, when the screw 36 is tightened and, along with the annular groove in the anvil which is formed by the cutting edge, produces a form-fitting connection between the second secateur limb 12 and the anvil 22. Very low tolerances are also given in this case by producing the nut of the turned part and installation in a "fine"-punched hole.

The annular cutting edge 48 should have symmetry, in terms of the angle to the axis, such that upon penetration into the aluminum, the forces cancel one another out. The angles α and β are approximately 30°. As can be seen, in particular, from FIG. 4, the annular cutting edge 48 is located in the outer center region of the annular end surface, as a result of which the cutting edge is prevented from tilting during the tightening operation.

For adjustment purposes, the anvil 22 is pivoted, about the axis 32, on the bushing 34 during closure of the secateurs until the anvil surface butts against the cutting edge 24 in a light-gap-free manner. These screws 26 and 36 are then tightened via their hexagonal socket. In this case, the annular cutting edge 48 digs into the anvil and gives form-fitting support, with the result that it is no longer possible for the anvil to be pivoted about the axis 32. This light-gap-free adjustment is permanently maintained.

Referring to FIG. 5, a hexagonal nut 44 with an annular cutting edge 48 that faces toward the anvil 22 is illustrated (FIGS. 5(a) and 5(b)). Instead of providing the nut 44 with an annular cutting edge 48, or in addition to this, it is also possible for the screw head 46 of the screw 36 to be provided with an annular cutting edge on its end side which is directed toward the anvil 22. Instead of a smooth annular cutting edge 48, it is also possible to provide a toothed annular cutting edge 50 on the nut 44, as illustrated in FIGS. 5(b) and 5(d).

List of designations
10 Bearing screw
12 Secateur limb
14 Secateur limb
16 Handle shell
18 Handle shell
20 Cutting blade
22 Anvil
24 Cutting edge
26 First screw
28 Bore
30 Threaded hole
32 Pivot axis
34 Bearing bushing
36 Second screw
38 Shank
40 Arcuate slot
42 Hole
44 Cutting nut
46 Screw head
48 Annular cutting edge

What is claimed is:

1. Secateurs, comprising:
   a first and a second secateur limb in a pivotal relationship with each other for cooperative operation;
   a bearing screw coupled to the secateur limbs to provide the pivotal relationship;
   a cutting blade fixedly connected to the first secateur limb and coupled to the bearing screw to provide a pivotal motion for the cutting blade in relation to the second secateur limb;
   an anvil adjustably connected to the second secateur limb and positioned to adjust in relation to the cutting blade when the secateur limbs are pivoted;
   a bearing coupled to the anvil and the second secateur limb to provide a pivot axis for the anvil in relation to the second secateur limb;
   a first screw that extends through the anvil and the bearing and connects to the second secateur limb for maintaining a relationship between the anvil, the bearing, and the second secateur limb;
   an arcuate slot in the anvil arranged concentric with the pivot axis provided by the bearing;
   a second screw that extends through the arcuate slot for adjusting the anvil;
   a nut that extends through the second secateur limb and cooperates with the second screw to clamp the anvil to the second secateur limb;
   at least one of a head portion of the second screw and an end surface of the nut having an annular surface directed toward the anvil to provide an annular cutting edge, such that the annular cutting edge protrudes into a lateral surface of the anvil when the second screw and the nut are tightened, thereby preventing slippage in an adjustment of an alignment between the cutting blade and the anvil to provide a light-gap-free relationship.

2. The secateurs as claimed in claim 1, wherein the annular cutting edge (48) is arranged in an outer region of the annular end surface of the nut (44) and/or screw head (46).

3. The secateurs as claimed in claim 2, wherein the annular cutting edge (48) extends symmetrically to both sides from its vertex, and the cutting angle is approximately 60°.

4. The secateurs as claimed in claim 3, wherein the annular cutting edge is of smooth design.

5. The secateurs as claimed in claim 3, wherein the annular cutting edge is of toothed design.

6. The secateurs as claimed in claim 2, wherein the annular cutting edge is of smooth design.

7. The secateurs as claimed in claim 2, wherein the annular cutting edge is of toothed design.

8. The secateurs as claimed in claim 1, wherein the first screw (26) is screwed into a threaded hole (30) of the secateur limb (12), which consists of hardened sheet steel, and can be tightened against the anvil (22) by way of its head.

9. The secateurs as claimed in claim 8, wherein the annular cutting edge is of smooth design.

10. The secateurs as claimed in claim 8, wherein the annular cutting edge is of toothed design.

11. The secateurs as claimed in claim 1, wherein the bearing comprises a bearing bushing (34) which is inserted into an annular recess in each of the anvil (22) and the second secateur limb (12).

12. The secateurs as claimed in claim 11, wherein the annular cutting edge is of smooth design.

13. The secateurs as claimed in claim 11, wherein the annular cutting edge is of toothed design.

14. The secateurs according to claim 1, wherein:
the nut is in a rotationally fixed relationship with the second secateur limb; and a shank of the second screw projects through the arcuate slot of the anvil.

15. The secateurs according to claim 1, wherein the annular cutting edge has a smooth shape.

16. The secateurs according to claim 14, wherein the annular cutting edge has a toothed shape.

17. The secateurs according to clam 1, wherein the annular cutting edge is smooth in shape.

18. The secateurs according to claim 1, wherein the annular cutting edge has a toothed shape.

* * * * *